United States Patent
Mei et al.

(10) Patent No.: US 7,524,903 B2
(45) Date of Patent: Apr. 28, 2009

(54) PROCESS AND APPARATUS FOR THE POLYMERIZATION OF PROPYLENE

(75) Inventors: Gabriele Mei, Ferrara (IT); Joachim T. M. Pater, Ferrara (IT); Stefano Bertolini, Ancona (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 11/793,661

(22) PCT Filed: Dec. 9, 2005

(86) PCT No.: PCT/EP2005/056624

§ 371 (c)(1),
(2), (4) Date: Jun. 20, 2007

(87) PCT Pub. No.: WO2006/067052

PCT Pub. Date: Jun. 29, 2006

(65) Prior Publication Data

US 2007/0270556 A1     Nov. 22, 2007

Related U.S. Application Data

(60) Provisional application No. 60/638,334, filed on Dec. 22, 2004.

(30) Foreign Application Priority Data

Dec. 20, 2004   (EP) ................................. 04106741

(51) Int. Cl.
*C08F 2/34* (2006.01)
*C08F 210/16* (2006.01)
*B01J 8/18* (2006.01)
(52) U.S. Cl. ..................... 526/65; 526/64; 526/67; 526/88; 526/348; 525/53; 525/240

(58) Field of Classification Search ............ 526/64, 526/65, 67, 88, 348; 525/53, 240
See application file for complete search history.

(56) References Cited

U.S. PATENT DOCUMENTS 4,298,718 A   11/1981   Mayr et al.

(Continued)

FOREIGN PATENT DOCUMENTS

EP    373660    6/1990

(Continued)

OTHER PUBLICATIONS

D. Geldart, editor, "High Velocity Fluidized Beds," *Gas Fluidization Technology*, John Wiley & Sons Ltd., p. 155-196 (1986).

(Continued)

*Primary Examiner*—Roberto Rábago
(74) *Attorney, Agent, or Firm*—William R. Reid

(57) ABSTRACT

A process for preparing heterophasic propylene copolymers by polymerizing propylene in the presence of a polymerization catalyst and hydrogen as a molecular weight regulator, the process comprising the following steps:

a) polymerizing in gas- or liquid-phase propylene to prepare a crystalline polymer fraction;
b) copolymerizing ethylene with propylene and/or 1-butene, and optionally one or more alpha-olefin comonomers $C_5$-$C_{12}$, in a gas-phase reactor having interconnected polymerization zones, wherein the growing polymer particles flow upward through a first polymerization zone (riser) under fast fluidization or transport conditions, leave said riser and enter a second polymerization zone (downcomer) through which they flow downward under the action of gravity.

15 Claims, 2 Drawing Sheets

U.S. PATENT DOCUMENTS

| | | | |
|---|---|---|---|
| 4,399,054 | A | 8/1983 | Ferraris et al. |
| 4,495,338 | A | 1/1985 | Mayr et al. |
| 6,395,831 | B1 | 5/2002 | Pelliconi et al. |
| 6,410,136 | B1 | 6/2002 | DeMeuse |
| 6,465,574 | B1 | 10/2002 | Mulas et al. |
| 6,485,817 | B1 | 11/2002 | DeMeuse |
| 6,514,625 | B1 | 2/2003 | DeMeuse |
| 6,689,845 | B1 | 2/2004 | Govoni et al. |
| 6,818,583 | B1 | 11/2004 | Morini et al. |
| 2005/0107538 | A1 | 5/2005 | Pelliconi et al. |
| 2006/0155071 | A1 | 7/2006 | Morini et al. |
| 2006/0194924 | A1 | 8/2006 | Pelliconi |
| 2007/0010625 | A1 | 1/2007 | News et al. |
| 2007/0093621 | A1 | 4/2007 | Meier et al. |

FOREIGN PATENT DOCUMENTS

| | | |
|---|---|---|
| EP | 416379 | 3/1991 |
| EP | 640649 | 3/1995 |
| EP | 674991 | 10/1995 |
| EP | 1012195 | 6/2000 |
| EP | 1428855 | 6/2004 |
| WO | 00/11076 | 3/2000 |
| WO | 00/63261 | 10/2000 |
| WO | 03/031514 | 4/2003 |
| WO | 2004/048424 | 6/2004 |
| WO | 2004/087805 | 10/2004 |
| WO | 2004/087807 | 10/2004 |
| WO | WO 2004/087805 A1 * | 10/2004 |
| WO | 2005/019280 | 3/2005 |
| WO | 2006/067043 | 6/2006 |

OTHER PUBLICATIONS

J. Randall, "A Review of High Resolution Liquid $^{13}$Carbon Nuclear Magnetic Resonance Characterizations of Ethylene-Based Polymers," *JMS-Rev. Macromol. Chem. Phys.*, C29(2&3), p. 201-317 (1989).

C. Carman et al., "Monomer Sequence Distribution in Ethylene-Propylene Rubber Measured by 13C NMR. 3. Use of Reaction Probability Model," *Macromolecules*, vol. 10(3), p. 536-544 (1977).

* cited by examiner

PROCESS AND APPARATUS FOR THE POLYMERIZATION OF PROPYLENE

This application is the U.S. national phase of International Application PCT/EP2005/056624, filed Dec. 9, 2005, claiming priority to European Patent Application 04106741.4 filed Dec. 20, 2004, and the benefit under 35 U.S.C. 119(e) of U.S. Provisional Application No. 60/638,334, filed Dec. 22, 2004; the disclosures of International Application PCT/EP2005/056624, European Patent Application 04106741.4 and U.S. Provisional Application No. 60/638,334, each as filed, are incorporated herein by reference.

The present invention relates to a process and apparatus for the gas-phase polymerization of propylene, particularly to a gas-phase polymerization process for the preparation of heterophasic propylene copolymers. The obtained propylene copolymers are particularly suitable for producing items endowed with a good balance of stiffness and impact resistance.

It is known that crystalline propylene polymers possess good characteristics in terms of stiffness, processability in the molten state, heat resistance and resistance to atmospheric agents and to solvents. Also known is that their impact resistance (resilience) is very low: said property can be remarkably improved by adding copolymers of ethylene and alfa-olefins, such as propylene and 1-butene, to the crystalline matrix.

Such heterophasic propylene copolymers can be prepared by physically blending or mixing a crystalline propylene (co)polymer with an elastomeric ethylene-propylene copolymer. Of course, an intensive and energetic mixing action is required to achieve the dispersion of the copolymer rubber in the polyolefin so as to obtain the desired polymeric blends. The formation of thermoplastic elastomers (TPE) is then achieved by means of dynamic vulcanization of such blends. However, the homogeneity of the final product is poor.

In order to avoid the disadvantages associated with physical blending, while at the same time avoiding the need to dynamically vulcanize the blends, efforts have been made to produce reactor or chemical blends of a crystalline polypropylene and an amorphous ethylene-propylene co-polymer by a sequential polymerization in one or more reactors. Different production methods have been adopted: two reactors in series, eventually with a different catalyst in each reactor. By using a sequence of two polymerization reactors in the presence of Ziegler/Natta catalyst system and tailoring the process conditions, it is possible to produce a wide range of heterophasic propylene copolymers, as well as different concentrations of crystalline component and amorphous component. In fact, each reactor can work at different polymerization conditions, in terms of catalyst, pressure, temperature, amounts of comonomer(s) and molecular weight regulator(s).

EP 373 660 discloses a process for producing polypropylene compositions with a high impact resistance at low temperatures and good transparency. The process is carried out in a sequence of two polymerization reactors. In the first reactor propylene is copolymerized with a little amount of ethylene or another alpha-olefin to obtain the crystalline copolymer: the polymerization in this stage is carried out in a liquid propylene suspension maintaining an adequate and constant over-pressure of the desired comonomer. In the second reactor ethylene is copolymerized with propylene and/or higher alpha-olefins to obtain the elastomeric component: this stage is carried out in a gas-phase reactor while maintaining the composition of the gaseous mixture constant.

EP 416 379 discloses a process for producing a thermoplastic polyolefin composition carried out in a sequence of at least two polymerization stages. The obtained polymer composition comprises: a) greater than 60 to 85 parts of a crystalline polymer fraction; b) from 1 up to less than 15 parts of a semi-crystalline, low density, essentially linear copolymer fraction having a crystallinity of 20 to 60%; and c) from 10 to less than 39 parts of an amorphous copolymer fraction containing from 30 to 80% by weight of ethylene. The preferred method of preparation is a multistage process comprising the polymerization of component a) in the presence of liquid propylene, and the polymerization of component b) and c) in a gas phase. The component a) obtained from the liquid-phase first reactor is transferred into a flash pipe and any unreacted monomers are degassed at essentially atmospheric pressure and then fed to a second reactor for a gas-phase polymerization of the relevant monomers to form components b) and c). The resultant product is then transferred to another reactor for an additional gas-phase polymerization of the relevant monomers in order to increase the amount of components b) and c) in the final product.

EP 640 649 discloses a process for producing a polyolefin composition having a good balance of flexural modulus and impact strength, the composition comprising:
- 30-60% of a propylene homopolymer or copolymer soluble in xylene at ambient temperature in a percentage lower than 5%;
- 14-30% of a fraction consisting of copolymers of propylene with ethylene, said fraction being soluble in xylene at ambient temperature in a percentage ranging from 60 to 99%;
- 10-25% of a copolymer of ethylene with a C3-C8 alpha-olefin in a quantity ranging from 10% to 30%, said copolymer being soluble in xylene at ambient temperature in a percentage ranging from 10 to 50%;
- 5-45% of a mineral filler in a particle form having an average diameter from 0.1 to 5.0 µm.

These compositions are prepared by sequential polymerization processes based on the use of particular Ziegler-Natta catalysts, producing in polymerization a mixture of components A), B), and C), and then adding the component D) by blending. The polymerization is carried out in a gas phase in at least three consecutive stages, one for each of the above mentioned components, operating in each gas-phase reactor in the presence of the polymer and the catalyst coming from the preceding stage.

However, the multistage polymerization processes described in the above EP 373 660, EP 416379, EP 640649 lead to final heterophasic copolymers having an amorphous fraction lacking in homogeneity. In fact, in each reactor of said cascade process a different polymer is generated in term of molecular weight, chemical composition and crystallinity, so that the final polymer shows an intrinsic heterogeneity, caused by the residence time distribution. The inherent difference in the residence times of the polymer particles exiting each polymerization step causes a structural dishomogeneity in the final product, especially when two distinct rubbery phases having a different ethylene content are aimed to be prepared. Depending on the residence time in the sequence of polymerization steps, the obtained polymer particles show a larger or a smaller fraction made of a more rubbery phase and a larger or a smaller fraction made of a less rubbery phase (or viceversa).

The lack of homogeneity and the poor degree of mutual dispersion of the two rubbery fractions can give serious problems and drawbacks downstream the finishing section of the polymerization plant. In fact, after steaming and drying of the polymer, the powders are pneumatically conveyed to storage tanks, where the polymer particles are stored before to be subjected to extrusion.

If the two rubbery fractions are not mutually well dispersed into the crystalline matrix, the polymer has a low degree of homogeneity, so that the presence of an excessive amount of the more rubbery fraction on the particles surface increases considerably the tackiness of the polymer particles. As a consequence, agglomeration phenomena between the contiguous particles can easily occur during the pneumatic conveyance of the polymer, and especially during the storage time of the polymer powders into the tanks. The polymer can adhere to the walls of the storage tanks or give rise to the formation of polymer lumps: these drawbacks have to be avoided in order to manage reliably the polymer particles along the line connecting the finishing section to the extrusion step.

An improvement over the lack of homogeneity typically given by the conventional polymerization processes is represented by the gas-phase polymerization process described in the applicant's earlier EP-B-1012195. This process is carried out in a gas-phase reactor having interconnected polymerization zones, where the growing polymer particles flow through a first polymerization zone (riser) under fast fluidization conditions, leave said riser and enter a second polymerization zone (downcomer) through which they flow in a densified form under the action of gravity, leave said downcomer and are reintroduced into the riser, thus establishing a circulation of polymer between the two polymerization zones. A fluid of composition different from that present in the riser is introduced in the upper portion of the downcomer, thus acting as a barrier to the gas mixture coming from the riser. By properly adjusting the polymerization conditions and the monomer concentrations in said two polymerization zones, it is possible to produce a wide variety of bimodal homopolymers and random copolymers. The continuos recirculation of the growing polymer particles through reaction zones of different compositions allows to increase the level of homogeneity in the final polymer compared with the products obtained from a sequence of serially connected polymerization reactors.

However, the disclosure of EP-B-1012195 does not teach how to obtain heterophasic propylene copolymers endowed with satisfactory properties of stiffness and impact resistance. In fact, heterophasic copolymers endowed with such features cannot be obtained according to the disclosure of EP-B-1012195, since the feeding of a large amount of ethylene to the riser to produce the rubber component would inevitably enter the downcomer, thus lowering considerably the degree of crystallinity of the polymer component prepared in the downcomer: consequently, it would not be possible to prepare in the downcomer a polymer fraction endowed with a high crystallinity.

In view of the foregoing, there is the need of adapting the polymerization process described in EP-B-1012195 to the preparation of heterophasic propylene copolymers, overcoming the drawbacks of poor homogeneity of the copolymers obtained by the conventional gas-phase polymerization processes.

It has now been found a process for preparing heterophasic propylene copolymers by polymerizing propylene in the presence of a polymerization catalyst and hydrogen as a molecular weight regulator, the process comprising the following steps:

a) polymerizing propylene in a gas- or liquid-phase, optionally together with one or more α-olefin comonomers, to prepare a crystalline polymer fraction;

b) copolymerizing ethylene with propylene and/or 1-butene, and optionally one or more alpha-olefin comonomers $C_5$-$C_{12}$, in a gas-phase reactor having interconnected polymerization zones, wherein the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, thus establishing a circulation of polymer between said two polymerization zones.

Figure 1:
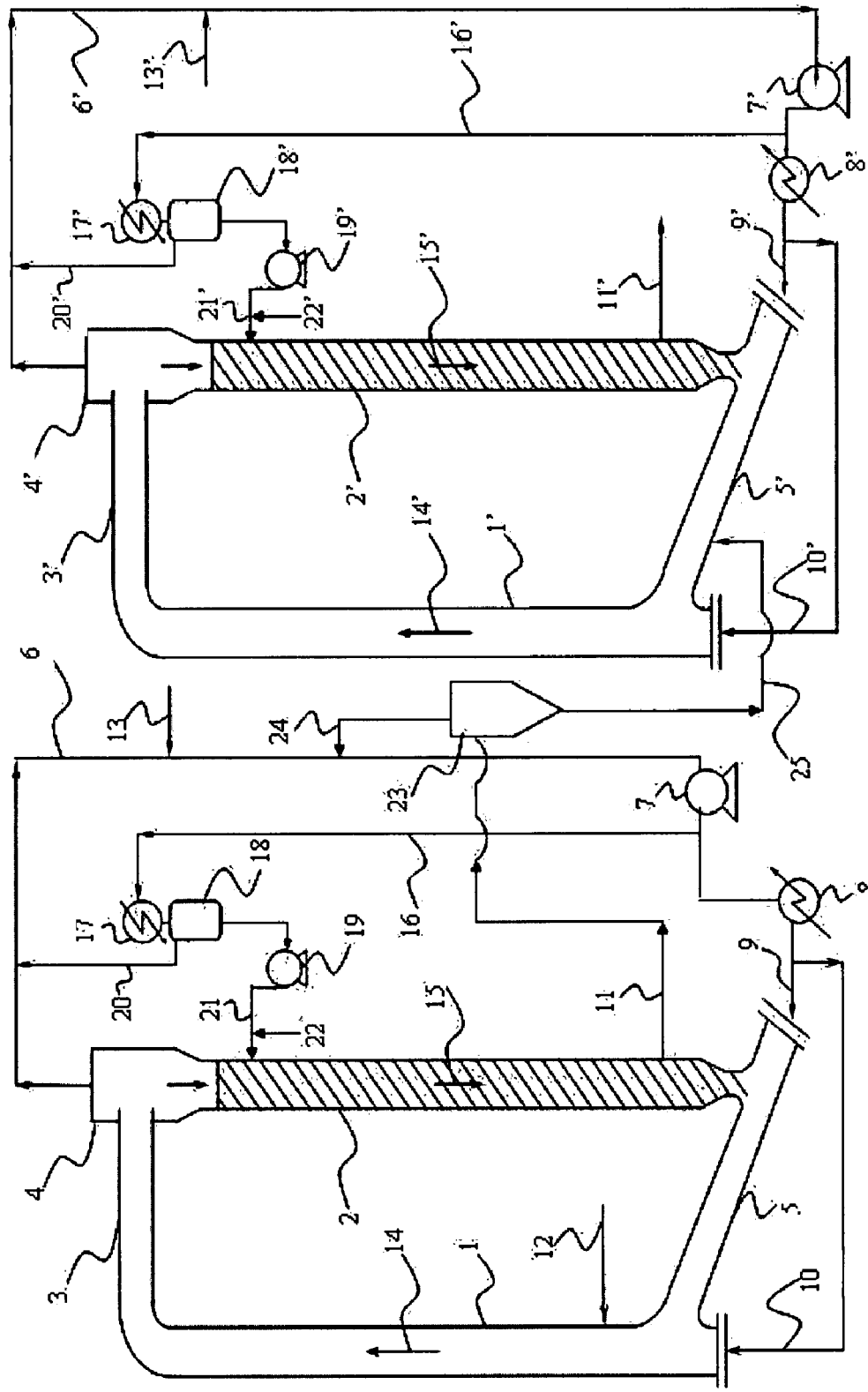
FIG. 1 illustrates a process flow diagram of a polymerization process conducted in two gas-phase reactors having interconnected polymerization zones.

The process according to the present invention allows to obtain from step a) a high crystallinity homopolymer or random copolymer of propylene, while in step b) an amorphous copolymer is formed. In particular, the final polymer discharged from the sequence of polymerization reactors can comprise two distinct fractions of elastomeric polymer produced in step b), intimately mixed and dispersed into the high crystalline polymer fraction formed in the polymerization step a).

The heterophasic propylene copolymers obtained by means of the present invention are particularly suitable for producing items endowed with a high balance of stiffness and impact resistance. These mechanical properties are particularly noteworthy in the automotive industry to produce interior trims and bumpers.

According to the present invention the above physical-mechanical properties can be obtained carrying out the (co)polymerization of propylene in two serially interconnected polymerization reactors. These reactors can be gas-phase reactors of the type as described in EP-B-1012195, characterized by two interconnected polymerization zones where the polymer particles flow under different fluidization conditions and reactants compositions.

In the first polymerization zone (riser), fast fluidization conditions are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer. In other words, the polymer flows vertically down through the downcomer in a plug flow (packed flow mode), so that only small quantities of gas are entrained between the polymer particles.

According to a first and preferred embodiment of the present invention, a sequence of two gas-phase reactors having the above interconnected polymerization zones is used to carry out both step a) and b).

According to a second embodiment of the present invention, the polymerization step a) can be performed in a liquid phase reactor, preferably a loop reactor.

According to an alternative embodiment, a gas-phase fluidized bed reactor can be exploited to carry out step a) of the present invention.

Preferably, no comonomer is fed to the first reactor, so that a highly crystalline propylene homopolymer is obtained from step a). However, limited amounts of comonomers may be also fed to step a), on condition that the obtained polymer fraction has a solubility in xylene at ambient temperature lower than 7% by weight, preferably lower than 4%, otherwise the crystallinity of said polymer fraction is not satisfying.

Generally, the crystalline polymer fraction obtained in step a) forms from 30 to 90% by weight, preferably from 60 to 90% by weight, of the heterophasic copolymer produced in the overall process, i.e. in the first and second serially connected reactors.

POLYMERIZATION STEP a)—FIRST EMBODIMENT

According to a first embodiment of the invention a gas-phase reactor having the above interconnected polymerization zones is used to carry out step a).

A gaseous mixture comprising propylene, hydrogen and an inert gas is fed to said reactor in the presence of a highly active catalyst of the Ziegler-Natta or metallocene type.

The operating temperature in the gas-phase reactor of step a) is selected between 50 and 120° C., preferably between 70 and 95° C., while the operating pressure is between 0.5 and 10 MPa, preferably between 1.5 and 5.0 MPa.

The gas-phase reactor of step a) can be operated maintaining similar concentrations of propylene and hydrogen within the riser and the downcomer. In this case, a monomodal crystalline polymer fraction is produced in the polymerization step a) carrying out the following operative conditions into the riser and downcomer: the hydrogen/propylene molar ratio is comprised between 0.0005 and 1.0, preferably between 0.01 and 0.2, the propylene monomer being comprised from 20% to 100% by volume, preferably from 50 to 80% by volume, based on the total volume of the gases present in the reactor. The remaining portion of the feeding mixture is comprised of inert gases and one or more α-olefin comonomers, if any. Inert gases useful to dissipate the heat generated by the polymerization reaction are conveniently selected from nitrogen or preferably saturated light hydrocarbons, the most preferred one being propane.

In order to broaden the molecular weight distribution of the crystalline polypropylene fraction, the gas-phase reactor of step a) can be conveniently operated establishing different conditions of propylene and hydrogen concentration within the riser and the downcomer. In this particular case, a crystalline polymer fraction having a bimodal molecular weight distribution is produced in the polymerization step a). To this purpose, in step a) the gas mixture entraining the polymer particles and coming from the riser can be partially or totally prevented from entering the downcomer, so as to obtain two different gas composition zones. This can be achieved by feeding a gas and/or a liquid mixture into the downcomer through a line placed at a suitable point of the downcomer, preferably in the upper part thereof. Said gas and/or liquid mixture should have a suitable composition, different from that of the gas mixture present in the riser. The flow of said gas and/or liquid mixture may be regulated so that an upward flow of gas counter-current to the flow of the polymer particles is generated, particularly at the top thereof, acting as a barrier to the gas mixture coming from the riser.

Advantageously, a mixture with a relatively low content of hydrogen can be fed to the upper part of the downcomer, in order to produce in the downcomer a propylene polymer with an average molecular weight higher than the polypropylene produced in the riser. In this case, step a) produces a crystalline polypropylene having a bimodal molecular weight distribution according to the following operating conditions: the hydrogen/propylene molar ratio in the downcomer can be comprised between 0 and 0.2, the propylene concentration being comprised from 20 to 100%, preferably from 50 to 80% by volume based on the total volume of gases present in the downcomer.

In the riser the hydrogen/propylene molar ratio can be comprised between 0.0005 and 1.0, the propylene concentration being comprised between 20 and 99% by volume based on the total volume of gases present in the riser. The remaining gas comprises propane or similar inert gases, and optionally one or more alpha-olefin comonomers $C_4$-$C_{12}$.

POLYMERIZATION STEP a)—SECOND EMBODIMENT

According to the second embodiment a liquid-phase loop reactor is used to carry out the polymerization step a).

A liquid mixture comprising propylene, hydrogen and, optionally an inert hydrocarbon, is fed to the loop reactor in the presence of a highly active catalyst of the Ziegler-Natta or metallocene type. Preferably, no comonomer is fed to the reactor so that a highly crystalline propylene homopolymer is obtained from step a). However, limited amounts of liquid comonomers may be also fed to step a): generally, the total amount of comonomers fed to step a) should be less than 5% by weight.

Preferably the polymerization is carried out at low concentrations of the inert hydrocarbon, so that liquid propylene is substantially the reaction medium (bulk polymerization). The operating temperature in the loop reactor is selected between 50° C. and 90° C., preferably between 65 and 80° C., while the operating pressure is between 2.0 and 10 MPa, preferably between 2.5 and 5.0 MPa.

The total amount of $H_2$ fed to the loop reactor is less than 50000 ppm, preferably 100-15000 ppm weight, based on the total feed of propylene.

In the loop reactor the propylene concentration is comprised between 60 and 100% by weight, preferably between 75 and 95%, based on the total amount of liquid present in the reactor. The remaining part of liquid comprises the inert hydrocarbon and one or more α-olefin comonomers, if any. The preferred comonomer is ethylene.

A polypropylene slurry is discharged from the loop reactor and is fed to the polymerization step b).

Polymerization Step b)

According to a peculiar feature of the process of the invention a gas-phase reactor having interconnected polymerization zones (described in detail in connection with FIGS. 1 and 2) is used to carry out the polymerization step b). The propylene polymer and the entrained gas discharged from the polymerization step a) are therefore transferred to said gas-phase polymerization reactor.

Preferably the polymer powder is passed through a solid/gas separation step, so that the gaseous mixture coming from step a) is prevented from entering the gas-phase reactor of step b). The gaseous mixture can be separated and recycled back to the first polymerization reactor, while the polymer particles are fed to the reactor of step b).

A suitable point of feeding of the polymer into the second reactor is at the bottom connection between the downcomer and the riser, where the solid concentration is particularly low, so that the flow conditions are not negatively affected by the introduction of the polymer particles coming from step a).

The operating temperature in step b) is in a range from 50 to 120° C., and the pressure is in a range from 0.5 to 10 MPa. Said gas-phase reactor is aimed at preparing an amorphous polymer fraction by copolymerizing ethylene with propylene and/or 1-butene.

According to an embodiment of the invention, the gas-phase reactor of step b) can be operated maintaining similar concentrations of monomers and hydrogen within the riser and the downcomer. In this case, only an elastomeric polymeric fraction is produced in the polymerization step b), said fraction being partially soluble in xylene at ambient temperature in a percentage ranging from 15 to 98% by weight, preferably from 40 to 90%. The hydrogen/ethylene molar ratio in step b) is comprised between 0 and 0.5, the ethylene concentration being comprised from 3.0 to 80%, preferably from 5.0 to 50% by volume, the total concentration of propylene and/or 1-butene being comprised from 10% to 90% by volume.

One or more alpha-olefin comonomers $C_5$-$C_{12}$ can be also fed to step b), optionally together with propane or other inert gases. The comonomers may be selected from 1-pentene, 1-hexene, 4-methyl-1-pentene, 1-heptene and 1-octene, preferably 1-hexene.

According to an alternative and preferred embodiment of the invention, the gas-phase reactor of step b) can be conveniently operated establishing different conditions of monomers and hydrogen concentration within the riser and the downcomer. In this particular case, two distinct elastomeric polymer fractions are produced in the polymerization step b). To this purpose, in step b) the gas mixture entraining the polymer particles and coming from the riser can be partially or totally prevented from entering the downcomer, so as to obtain two different gas composition zones. This can be achieved by feeding a gas and/or a liquid mixture into the downcomer through a line placed at a suitable point of the downcomer, preferably in the upper part thereof. Said gas and/or liquid mixture should have a suitable composition, different from that of the gas mixture present in the riser.

In particular, it is advantageous to feed a barrier mixture having an ethylene content lower than the gas mixture coming from the riser, in order to produce an elastomeric polymer fraction richer in ethylene in the riser. Preferably, the barrier mixture comprises mostly liquid propylene or 1-butene with little amounts of dissolved ethylene. As a consequence, two different rubber components are produced in the gas-phase reactor of step b), and the monomers concentration in the riser differs from that of the downcomer.

In the downcomer the following operative conditions can be established:
$H_2/C_2H_4$ molar ratio comprised between 0 and 0.4;
$C_2H_4/C_2H_4+C_3H_6$ molar ratio comprised between 0.01 and 0.6, preferably between 0.1 and 0.5;
total concentration of propylene and/or 1-butene being comprised from 5.0 to 90% by volume, based on the total volume of gases present in the downcomer.

The remaining gas comprises propane or similar inert gases, and optionally one or more alpha-olefin comonomers $C_5$-$C_{12}$. An ethylene/propylene rubber component is produced in the downcomer of step b), said component containing an ethylene percentage ranging from 10 to 60% by wt, preferably from 20 to 45% by wt.

In the riser the following operative conditions can be established:
$H_2/C_2H_4$ molar ratio from 0.005 to 1.0;
$C_2H_4/C_2H_4+C_3H_6$ molar ratio comprised between 0.1 and 1, preferably between 0.2 and 0.6;
total concentration of propylene and/or 1-butene comprised from 10% to 95% by volume, based on the total volume of gases present in the riser.

The remaining gas comprises propane or similar inert gases, and optionally one or more alpha-olefin comonomers $C_5$-$C_{12}$. An ethylene/propylene rubber component is produced in the riser of step b), said component containing an ethylene percentage ranging from 30 to 80% by wt, preferably from 40 to 70% by wt.

The final heterophasic copolymer, discharged through a line placed at the bottom part of the downcomer of the second reactor, is the polymer deriving from the sequential polymerization in the reactors of step a) and step b). When different ethylene concentrations are established in the polymerization zones of step b), the process of the present invention allows to bond a more amorphous elastomeric component with a less amorphous elastomeric component, simultaneously providing an efficient dispersion of said two elastomeric components into the crystalline matrix produced in the first polymerization step a).

The polymer powders coming from the polymerization process of the invention show high values of flowability, as demonstrated by the working examples below given. This is an important property of the obtained copolymers, providing a minimization of the agglomeration phenomena between the contiguous particles during the pneumatic conveyance of the polymer, and especially during the storage of the polymer powders in silos.

The heterophasic propylene copolymers obtained by the process of the invention are endowed with an improved balance of stiffness and impact resistance. The working examples show Izod impact values at 23° C. higher than 44 kJ/m², in combination with values of flexural modulus higher than 1115 MPa. Due to these physical-mechanical properties the heterophasic copolymers of the present invention can be successfully used to manufacture parts, components and materials useful in the automotive industry, such as automotive interior trims and bumpers. They can be also used in the manufacture of items for the industrial consumer market, including the medical, furniture, appliance industries, the building/construction and the recreational/sports industries.

The process of the present invention will now be described in details with reference to the enclosed drawings, which are illustrative and not limitative of the scope of the claimed process.

FIG. 1 shows the first embodiment of the present invention, where the reactors to carry out the polymerization steps a) and b) are gas-phase reactors having interconnected polymerization zones.

The first reactor (step a) comprises a riser 1 and a downcomer 2, wherein the polymer particles flow, respectively, upward under fast fluidization condition along the direction of the arrow 14 and downward under the action of gravity along the direction of the arrow 15. The riser 1 and the downcomer 2 are appropriately interconnected by sections 3 and 5. In said first reactor propylene is polymerized in the presence of hydrogen to produce the crystalline polymer fraction. To this aim, a gaseous mixture comprising propylene, hydrogen and propane, as an inert diluent, is fed to said first reactor through one or more lines 13, suitably placed at any point of the recycling system according to the knowledge of those skilled in art. The polymerization is carried out in the presence of a highly active catalyst system of the Ziegler-Natta or metallocene type. The various catalyst components are fed through line 12 to the riser 1 at the lower part thereof. After running through the riser 1, the polymer particles and the gaseous mixture leave the riser 1 and are conveyed to a solid/gas separation zone 4. The solid/gas separation can be effected by using conventional separation means such as, for example, a centrifugal separator (cyclone) of the axial, spiral, helical or tangential type.

From the separation zone 4, the polymer enters the downcomer 2. The gaseous mixture leaving the separation zone 4 is recycled to the riser 1 by means of a recycle line 6, equipped with means for the compression 7 and cooling 8.

After the compression means 7 and the cooling means 8, the recycle gas is divided into two separated streams, the first one is transferred to the connecting section 5 via the line 9 to favor the transfer of the polymer particles from the downcomer 2 to the riser 1. The second stream of recycle gas is fed via line 10 at the bottom of the riser 1 to establish fast fluidization conditions into the riser 1.

When a crystalline polymer fraction with a bimodal molecular weight distribution is wished to be prepared in the polymerization step a), a part of the recycle gas of line 6 is sent via line 16 to a condenser 17, where the gaseous stream is cooled at a temperature involving the partial condensation of propylene and the inert gases, such as propane. A separating vessel 18 is placed downstream the condenser 17. The gaseous mixture enriched in hydrogen, which collects at the top of the vessel 18 is recycled via line 20 to the recycle line 6. On the other hand, the condensed liquid is fed to the downcomer 2 via line 21. Said liquid can be fed to said downcomer 2 by means of a pump 19. The make-up components that must be present in the downcomer 2 in the previously indicated amounts can be fed as a liquid directly into the line 21 via line 22.

Line 21 for feeding the liquid barrier is placed in the upper part of the downcomer 2 and allows to partially or totally prevent the gas mixture coming from the riser 1 from entering the downcomer 2, so as to obtain two different gas composition zones, as previously explained.

The polymer obtained from step a) is discharged from the lower part of the downcomer 2 and is fed via line 11 to a solid/gas separator 23, in order to avoid the gaseous mixture coming from the first polymerization reactor from entering the reactor of step b). Said gaseous mixture is fed back to the recycle line 6 through line 24, while the separated propylene polymer is fed to the second reactor.

The second gas-phase reactor comprises a riser 1' and a downcomer 2', wherein the polymer particles flow, respectively, upward under fast fluidization conditions along the direction of the arrow 14' and downward under the action of gravity along the direction of the arrow 15'. The two polymerization zones 1' and 2' are appropriately interconnected by section 3' and 5'.

The propylene polymer exiting the gas/solid separator 23 is fed via line 25 to the connecting section 5' of the second gas-phase reactor. In said second gas-phase reactor ethylene is copolymerized with propylene and/or 1-butene in the presence of propane and hydrogen to produce an elastomeric polymeric fraction. A gaseous mixture comprising ethylene, propylene and/or 1-butene, hydrogen and propane is fed to said second gas-phase reactor through one or more lines 13', suitable placed at any point of the recycle line 6' according to the knowledge of those skilled in art.

Analogously to the first reactor, the growing polymer particles and the gaseous mixture leave the riser 1' and are conveyed to a solid/gas separation zone 4'. From the separation zone 4', the polymer enters the downcomer 2', while the gaseous mixture collects at the top of the separator 4', from which the gaseous mixture is transferred via line 6' to a compressor 7'. Downstream compressor 7' the recycle gas is split in two streams: a first stream is sent via line 16' to the condenser 17', where it is cooled at a temperature at which propylene and/or 1-butene together with propane are partially condensed. The second stream containing the recycle gas is cooled by means of the cooling mean 8' and is fed in a gaseous state to the connection zone 5' via line 9' and also to the bottom of the riser 1' via line 10'. A separating vessel 18' is placed downstream the condenser 17'. The gaseous mixture enriched in hydrogen and ethylene, which collects at the top of the vessel 18' is recycled via line 20' to the recycle line 6'. On the contrary, the condensed liquid is fed to the downcomer 2' via line 21'. Said liquid can be fed to the downcomer 2' by means of a pump 19'.

The make-up components (ethylene, propylene and/or 1-butene, optional $C_5$-$C_{12}$ comonomers) that should be present in the downcomer 2' in the previously indicated amounts can be fed as a liquid directly into the line 21' via line 22'. Line 21' for feeding the liquid barrier is placed in the upper part of the downcomer 2'.

The final ethylene/propylene copolymer resulting from the polymerization of step a) and b) is discharged via line 11'.

Figure 2:
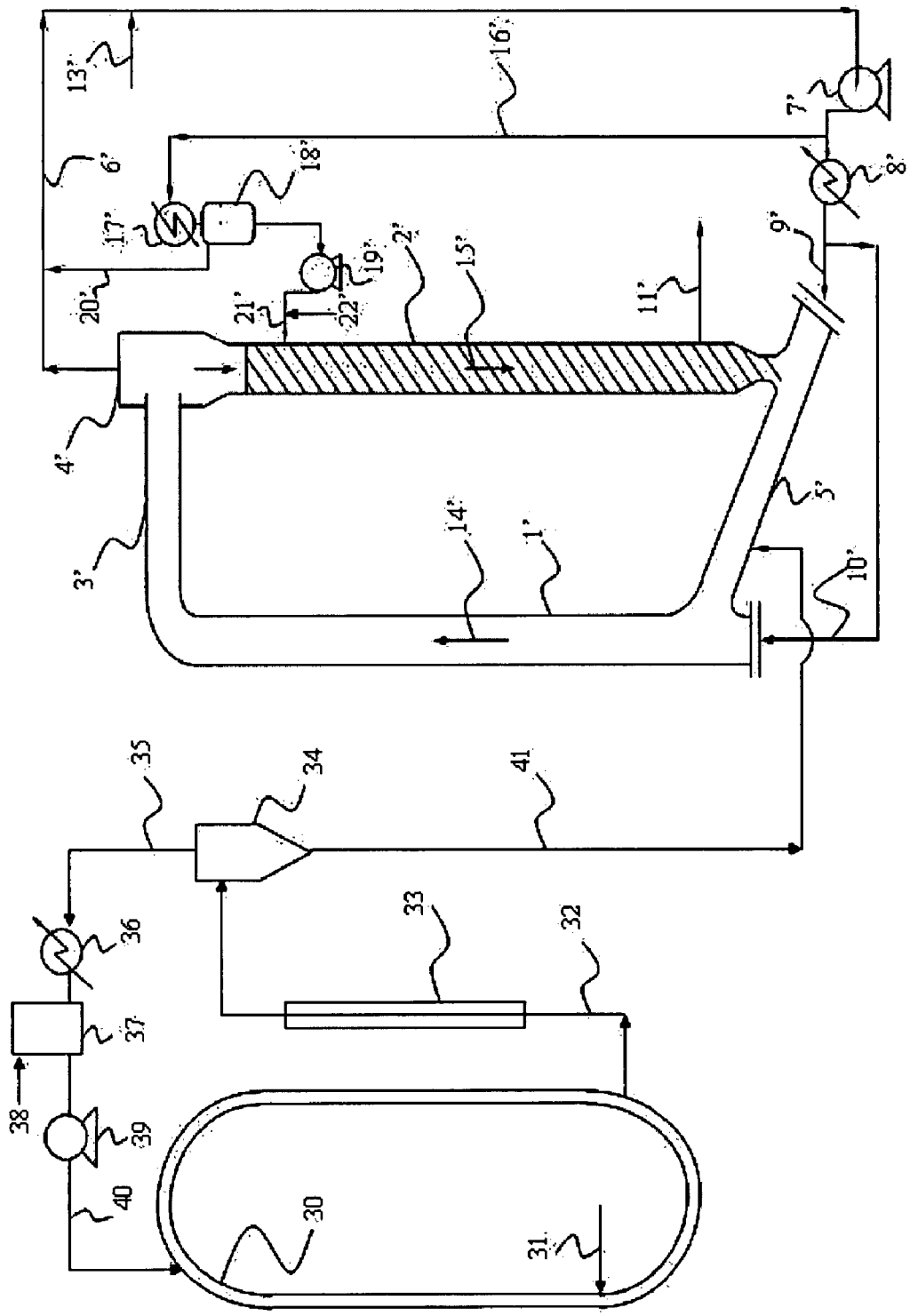
FIG. 2 illustrates a process flow diagram of a polymerization process where a first polymerization step is carried out in a liquid loop reactor.

FIG. 2 shows a second embodiment of the present invention, according to which the polymerization step a) is performed into a liquid loop reactor.

Liquid propylene together with the prepolymerized catalyst components is fed to the liquid loop reactor 30 via line 31. The obtained polypropylene slurry is continuously discharged from the loop reactor 30 and transferred via line 32 to a steam jacketed pipe 33, so as to ensure monomer vaporization during the polymer conveyance to a flash drum 34 operating a pressure in the range of 16-20 MPa.

A gaseous stream of unreacted monomers is collected at the top of the flash drum 34 before to be fed via line 35 to a condenser 36, where the unreacted monomers are condensed before the recycling to the loop reactor 30. Make-up liquid monomers are introduced via line 38 into a supply tank 37, from which the liquid monomers are withdrawn and conveyed via line 40 to the loop reactor 30 by means of a pump 39.

The crystalline polypropylene fraction collected at the bottom of the flash drum 34 is conveyed via line 41 to the gas-phase reactor of step b) having the same arrangement and elements already described in detail relatively to FIG. 1.

The polymerization process of the present invention can be carried out in the presence of a highly active catalyst system of the Ziegler-Natta or metallocene type.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Internal electron donor compounds can be selected among esters, ethers, amines, and ketones. In particular, the use of compounds belonging to 1,3-diethers, phthalates, benzoates and succinates is preferred.

In order to obtain a highly isotactic crystalline polypropylene from the polymerization step a), it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

The above catalysts show, in addition to a high polymerization activity, also good morphological properties that make them particularly suitable for the use in the gas-phase polymerization process of the invention.

Also metallocene-based catalyst systems can be used in the process of the present invention and they comprise:
at least a transition metal compound containing at least one n bond;
at least an alumoxane or a compound able to form an alkyl-metallocene cation; and
optionally an organo-aluminum compound.

A preferred class of metal compound containing at least one n bond are metallocene compounds belonging to the following formula (I):

$$Cp(L)_qAMX_p \qquad (I)$$

wherein M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —$CH_2SiMe_3$, —OEt, —OPr, —OBu, —OBz and —$NMe_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

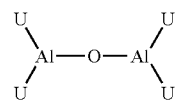

wherein the substituents U, same or different, are defined above.

In particular, alumoxanes of the formula:

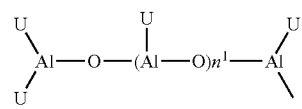

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

$$\underset{(Al-O)n^2}{\overset{U}{|}}$$

can be used in the case of cyclic compounds, wherein $n^2$ is an integer from 2 to 40 and the U substituents are defined as above.

The process of the invention will now be described in greater detail with reference to the following examples, being in no way limitative of the object of the invention.

EXAMPLES

| Characterization | |
|---|---|
| Melt index L (MIL): | ASTM-D 1238 (230° C./2.16 Kg) |
| Density: | ASTM-D 792 |
| Solubility index (X.S.): | in xylene at 25° C. |
| Intrinsic viscosity of xylene soluble fraction: | in tetrahydronaphtalene at 135° C. |
| Flexural elasticity modulus (MEF): | ASTM D-790. |
| IZOD impact: | ASTM D-4101 |

Polydispersity Index (PI):this property is strictly connected with the molecular weight distribution of the polymer under examination. It is inversely proportional to the creep resistance of the polymer in molten state. Said resistance, called modulus separation at low modulus value, i.e. 500 Pa, was determined at a temperature of 200° C. by using a parallel plates rheometer model RMS-800 marketed by Rheometrics (USA) operating at an oscillation frequency which increases from 0.1 rad/s to 100 rad/s.

From the modulus separation value, the PI is obtained by means of the equation $PI=54.6\times(\text{modulus separation})^{-1.76}$, where modulus separation is defined as the ratio [frequency at $G'=500$ Pa]/[frequency at $G''=500$ Pa], where G' is the storage modulus, and G" is the low modulus.

Powder Flowability: 4 Kg of polymer powder are charged in a standpipe having a conical exit. The powder is compressed for 6 hours at 0.5 kg/cm$^2$, at a temperature of 80° C. This compression simulates the bottom part of an intermediate silo. After 6 hours the bottom valve of the conical exit is opened, and the time required to empty the standpipe is measured.

Polymer powder having good flowability shows short flow times, while a sticky polymer requires long flow times.

General Polymerization Conditions

The process of the invention was carried out under continuous conditions in a plant comprising a sequence of two gas-phase reactors having interconnected polymerization zones, as shown in FIG. 1.

A Ziegler-Natta catalyst is used as the polymerization catalyst, comprising:
- a titanium solid catalyst component prepared with the procedure described in WO 00/63261, Example 10, according to which diethyl 2,3-diisopropyl-succinate is used as an internal donor compound;
- triethylaluminium (TEAL) as a cocatalyst;
- dicyclopentyldimethoxysilane as an external donor.

About 2 g/h of solid catalyst component are fed to the pre-contacting vessel, the weight ratio TEAL/solid component being of 5, the weight ratio TEAL/external donor being of 3.5. The above catalyst components are pre-contacted at a temperature of 15° C. for 10 minutes.

Example 1

Step a)

The catalyst, after prepolymerization with propylene, was fed via line 12 to the first gas-phase polymerization reactor of FIG. 1. In the first reactor propylene was polymerized using $H_2$ as the molecular weight regulator and in the presence of propane as inert diluent. The polymerization was carried out at a temperature of 75° C. and at a pressure of 2.8 MPa.

The composition of the gas phase of step a) is specified in Table 1, which refers to the operative conditions in the first reactor. No comonomer was fed to the first reactor. Make-up propane, propylene and hydrogen as molecular weight regulator were fed via line 13.

The properties of the crystalline polypropylene prepared in the first reactor were analyzed. It can be seen from Table 1 that the polypropylene resin had a melt index MIL of about 55 and a fraction soluble in xylene of 3.2% by weight.

The first reactor produced about 70% by weight (split wt %) of the total amount of polymer produced by both first and second reactors.

The polymer obtained in the first reactor was continuously discharged via line 11, separated from the gas into the gas/solid separator, and reintroduced into the connection section 5' of the second gas-phase.

Step b)

The second gas-phase reactor is aimed at preparing an amorphous polymer fraction by copolymerizing ethylene with propylene. According to this example, this gas-phase reactor is operated maintaining similar concentrations of monomers and hydrogen within the riser and the downcomer, so as to prepare one single elastomeric polymeric fraction in step b): these conditions are referred to as 'monomodal operation'.

The second reactor was operated under polymerization conditions at a temperature of about 73° C., and a pressure, of about 1.9 MPa. Make-up propane, ethylene, propylene and hydrogen were fed through line 13' into the recycling system.

The ethylene and propylene concentrations in this reactor are specified in Table 2, as well as the the hydrogen/ethylene molar ratio. The obtained elastomeric polymer fraction has a solubility in xylene of about 90% by weight.

A heterophasic propylene copolymer deriving from the above sequential polymerization is continuously discharged from the downcomer of the second reactor via line 11'.

Table 3 indicates the properties of this copolymer having a good balance of stiffness and impact resistance as indicated. The IZOD impact value at 23° C. is of 45.9 kJ/m$^2$, while the flexural modulus is of 865 MPa. Also a satisfying flowability is measured.

Example 2

The process of the invention was carried out with the same setup and the same polymerization catalyst of Example 1.

In step a) a polypropylene homopolymer was obtained according to the operative conditions given in Table 1.

In step b) a copolymer was produced with a different composition from the copolymer produced in Example 1. Details of the operative conditions in step a) and step b) are given in Tables 1 and 2.

The copolymer produced in step b) has a fraction soluble in xylene of 67% by weight. Table 3 shows the physical/mechanical properties of the final heterophasic copolymer. The material shows an Izod impact value at 23° C. of 4.5 kJ/m², and flexural modulus is of 1128 MPa. The polymer powder shows an excellent flowability.

Example 3

The process of the invention was carried out with the same setup and the same polymerization catalyst of Example 1.

Step a)

A propylene homopolymer was produced according to the operative conditions given in Table 1.

The melt index MIL was 65 dg/min and about 2.4 wt % of the polymer was soluble in xylene.

Step b)

According to this example, the gas-phase reactor is operated establishing different conditions of monomers and hydrogen concentrations within the riser and the downcomer, so as to prepare two distinct elastomeric polymeric fractions in step b). The operative conditions in the two polymerization zones were differentiated by feeding a barrier fluid via line 21' to the upper part of the downcomer. As a consequence, the riser contained a higher concentration of ethylene than the downcomer. Said different concentrations of monomers and hydrogen within the riser and the downcomer are indicated in Table 2. The rubber component produced in the riser originates from an ethylene/propylene ratio of: $C_2/(C_2+C_3)=0.457$, while the rubber component produced in the downcomer originates from a gas phase with this ratio being 0.166.

The composition of the fluid barrier in line 21' is indicated in Table 4. The partially liquid barrier of line 21' comes from the condensation step in the condenser 17', at working conditions of 17° C. and 1.9 MPa, wherein a part of the recycle stream is cooled and partially condensed.

A heterophasic copolymer was continuously discharged via line 11' and the properties of this polymer are specified in Table 3.

Example 4

The process of the invention was carried out with the same setup and the same polymerization catalyst of Example 1.

As in Example 3, a crystalline homopolymer was prepared in step a) and a fluid barrier was fed at the upper part of the downcomer of step b), so as to prepare two distinct elastomeric polymeric fractions in step b). However, the monomers and propane concentrations differ from Example 3 and the values are indicated in Tables 1 and 2.

The copolymer component produced in the riser of step b) originates from a ethylene to propylene ratio of: $C_2/(C_2+C_3)=0.395$, while the rubber component produced in the downcomer of step b) originates from a gas phase with this ratio being 0.279.

Table 3 shows the physical/mechanical properties of the obtained heterophasic copolymer. The material shows an IZOD impact value at 23° C. of 32.8 kJ/m², a flexural modulus of 947 MPa.

Example 5 (Comparative)

An apparatus comprising just one gas-phase polymerization reactor having interconnected polymerization zones was utilized. Said reactor has the same configuration of the gas-phase reactors shown in FIG. 1.

The same catalyst used in Example 1 was fed to the riser of said reactor. The temperature in the riser part of the reactor was kept at 65° C. and the pressure at about 2.3 MPa.

In order to prepare an elastomeric polymer fraction in the riser and simultaneously a crystalline propylene fraction in the downcomer, said gas-phase reactor is operated by establishing different conditions of monomers and hydrogen concentration within the riser and the downcomer. This is achieved by feeding a barrier fluid at the upper part of the downcomer. The operative conditions adopted within the riser and the downcomer are indicated in Table 5, while the composition of the fluid barrier is given in Table 4.

The properties of the final polymer are shown in Table 3. The obtained heterophasic propylene copolymer shows extremely low values of stiffness, since it is not possible to prepare a highly crystalline fraction in the downcomer due to the presence of $C_2H_4$ in the downcomer.

Moreover, the obtained copolymer is a sticky material, which gives drawbacks in the stable operation of the reactor and downstream equipment. Table 3 indicates no flowability of the polymer powder, because the polymer did not flow at all in the tested conditions.

TABLE 1

First Reactor (Step a)

|  |  | Ex. 1 | Ex. 2 | Ex. 3 | Ex. 4 |
|---|---|---|---|---|---|
| Operative Conditions | | | | | |
| Pressure | MPa | 2.8 | 2.8 | 2.8 | 2.8 |
| Temperature | ° C. | 75 | 75 | 78 | 75 |
| $H_2$ | Mole % | 4.3 | 4.5 | 4.7 | 5.5 |
| $C_3H_6$ | Mole % | 71.3 | 69.0 | 73.7 | 68.7 |
| $C_3H_8$ | Mole % | 24.4 | 26.5 | 21.6 | 25.8 |
| Split | wt % | 70 | 78 | 72 | 71 |
| Polymer Properties | | | | | |
| MIL | dg/min | 55 | 50 | 65 | 58 |
| XS | wt % | 3.2 | 3.0 | 2.4 | 2.8 |
| PI | — | — | 6.5 | 5.9 | 6.2 | 6.4 |

TABLE 2

Second Reactor (Step b)

|  |  | Ex. 1 | Ex. 2 | Ex. 3 | Ex. 4 |
|---|---|---|---|---|---|
| Operative conditions | | | | | |
| Temperature | ° C. | 73 | 73 | 73 | 73 |
| Pressure | MPa | 1.9 | 1.9 | 1.9 | 1.9 |
| Riser | | | | | |
| $H_2$ | mole % | 1.7 | 1.7 | 3.0 | 1.2 |
| $C_3H_6$ | mole % | 54.9 | 19.3 | 42.2 | 31.4 |
| $C_3H_8$ | mole % | 20.1 | 56.9 | 19.3 | 46.9 |
| $C_2H_4$ | mole % | 23.3 | 22.1 | 35.5 | 20.5 |
| $H_2/C_2H_4$ | mole rat | 0.073 | 0.077 | 0.085 | 0.059 |
| $C_2H_4/(C_2H_4 + C_3H_6)$ | mole rat | 0.298 | 0.534 | 0.457 | 0.395 |
| Downcomer | | | | | |
| $H_2$ | mole % | 1.64 | 1.83 | 0.71 | 1.08 |
| $C_3H_6$ | mole % | 57.3 | 25.8 | 69.7 | 38.3 |
| $C_3H_8$ | mole % | 19.0 | 54.0 | 13.0 | 44.0 |
| $C_2H_4$ | mole % | 20.6 | 21.4 | 13.9 | 14.8 |
| $H_2/C_2H_4$ | mole rat | 0.080 | 0.086 | 0.051 | 0.073 |
| $C_2H_4/(C_2H_4 + C_3H_6)$ | mole rat | 0.264 | 0.453 | 0.166 | 0.279 |
| $\dfrac{[C_2H_4/(C_2H_4+C_3H_6)]_{riser}}{[C_2H_4/(C_2H_4+C_3H_6)]_{downcomer}}$ | | 1.1 | 1.2 | 2.8 | 1.4 |

TABLE 3

Final copolymer

|  |  | Ex. 1 | Ex. 2 | Ex. 3 | Ex. 4 | Ex 5 (Comp) |
|---|---|---|---|---|---|---|
| MIL | dg/min | 13 | 15 | 15 | 15 | 9 |
| XS | wt % | 28.5 | 18.7 | 27 | 24.5 | 33.7 |
| IVXS | dl/g | 2.62 | 2.83 | 3.17 | 3.08 | 2.49 |
| Flexural Modulus | MPa | 865 | 1128 | 788 | 947 | 290 |
| IZOD at 23° C. | kJ/m2 | 45.9 | 4.5 | 47.6 | 32.8 | 65 |
| Flow time | sec | 584 | 29 | 142 | — | N.D |

*N.D: no discharge of powder, no powder flowability

TABLE 4

Composition of the fluid barrier

|  |  | Ex. 3 | Ex. 4 | Ex. 5 |
|---|---|---|---|---|
| $H_2$ | mole % | 0.2 | 0.5 | <20 PPM |
| $C_3H_6$ | mole % | 43.8 | 28.1 | 65.6 |
| $C_3H_8$ | mole % | 34.0 | 54.2 | 34.4 |
| $C_2H_4$ | mole % | 21.9 | 17.2 | <100 PPM |

TABLE 5

Comparative Example 5

| Temperature | ° C. | 65 |
|---|---|---|
| Pressure | MPa | 2.3 |
| Split produced in riser | wt % | 30 |
| Riser |  |  |
| $H_2$ | mole % | 1.0 |
| $C_3H_6$ | mole % | 56.0 |
| $C_3H_8$ | mole % | 33.8 |
| $C_2H_4$ | mole % | 9.2 |
| $H_2/C_2H_4$ | mole rat | 0.109 |
| $C_2H_4/(C_2H_4 + C_3H_6)$ | mole rat | 0.141 |
| Downcomer |  |  |
| $H_2$ | mole % | 0.2 |
| $C_3H_6$ | mole % | 56.5 |
| $C_3H_8$ | mole % | 41.8 |
| $C_2H_4$ | mole % | 1.5 |
| $H_2/C_2H_4$ | mole rat | 0.098 |
| $C_2H_4/(C_2H_4 + C_3H_6)$ | mole rat | 0.026 |
| $\dfrac{[C_2H_4/(C_2H_4+C_3H_6)]_{riser}}{[C_2H_4/(C_2H_4+C_3H_6)]_{downer}}$ |  | 5.4 |

The invention claimed is:

1. A process for preparing heterophasic propylene copolymers by polymerizing propylene in the presence of a polymerization catalyst and hydrogen as a molecular weight regulator, the process comprising the following steps:
   a) polymerizing propylene in a gas- or liquid-phase reactor, optionally together with at least one α-olefin comonomer, to prepare a crystalline polymer fraction; and
   b) copolymerizing ethylene with at least one of propylene and 1-butene, and optionally at least one $C_5$-$C_{12}$ alpha-olefin comonomer, in a gas-phase reactor having interconnected polymerization zones, wherein growing polymer particles flow upward through a first polymerization zone (riser) under fast fluidization or transport conditions, wherein a first ethylene/propylene rubber component is formed, leave said riser and enter a second polymerization zone (downcomer) through which they flow downward under the action of gravity, wherein a second ethylene/propylene rubber component is formed, leave said downcomer and are reintroduced into the riser, thus establishing a circulation of polymer between said two polymerization zones,
   wherein the first and second reactors are serially connected, and the crystalline polymer fraction of step a) from the first reactor is transferred to the second gas-phase reactor, and the first ethylene/propylene rubber component and second ethylene/propylene rubber component are distinct fractions of elastomeric polymer.

2. The process according to claim 1, further comprising a solubility in xylene at ambient temperature of the crystalline polymer fraction of step a) lower than 7% by weight.

3. The process according to claim 1, wherein a gas-phase reactor having interconnected polymerization zones is used to carry out step a).

4. The process according to claim 1, further comprising an operating temperature in step a) between 50 and 120° C. and a pressure between 0.5 and 10 MPa.

5. The process according to claim 3, wherein in the gas-phase reactor of step a) the riser and downcomer operate at different propylene and hydrogen concentrations, with a hydrogen/propylene molar ratio in the downcomer and a hydrogen/propylene molar ratio in the riser.

6. The process according to claim 5, wherein the hydrogen/propylene molar ratio in the downcomer is between 0 and 0.2, and further comprising a propylene concentration of from 20 to 100%.

7. The process according to claim 6, wherein the hydrogen/propylene molar ratio in the riser is between 0.0005 and 1.0, and the propylene concentration is between 20 and 99% by volume.

8. The process according to claim 1, wherein step a) is carried out in a liquid-phase loop reactor.

9. The process according to claim 8, wherein said liquid-phase loop reactor is operated at a temperature between 50° C. and 90° C. and a pressure between 2.0 and 10 MPa.

10. The process according to claim 1, wherein the gas-phase reactor of step b) is operated at different conditions of monomers and hydrogen concentration within said riser and said downcomer.

11. The process according to claim 10, further comprising in said downcomer:
   a $H_2/C_2H_4$ molar ratio comprised between 0 and 0.4;
   an $C_2H_4/C_2H_4+C_3H_6$ molar ratio comprised between 0.01 and 0.6; and
   a total concentration of propylene and/or 1-butene comprised from 5.0 to 90% by volume.

12. The process according to claim 10, wherein the second ethylene/propylene rubber component in said downcomer contains an ethylene percentage ranging from 10 to 60% by weight.

13. The process according to claim 12, further comprising in said riser:
   a $H_2/C_2H_4$ molar ratio from 0.005 to 1.0;
   an $C_2H_4/C_2H_4+C_3H_6$ molar ratio comprised between 0.1 and 1; and
   a total concentration of propylene and/or 1-butene comprised from 10% to 95% by volume.

14. The process according to claim 10, wherein the first ethylene/propylene rubber component produced in said riser contains an ethylene percentage ranging from 30 to 80% by wt.

15. The process according to claim 1, wherein the heterophasic propylene copolymers comprise Izod impact values at 23° C. higher than 44 kJ/m², and values of flexural modulus higher than 1115 MPa.

* * * * *